Feb. 6, 1968     R. G. DUNLOP     3,367,287
FREIGHT HANDLING APPARATUS
Filed Sept. 7, 1965     3 Sheets-Sheet 1
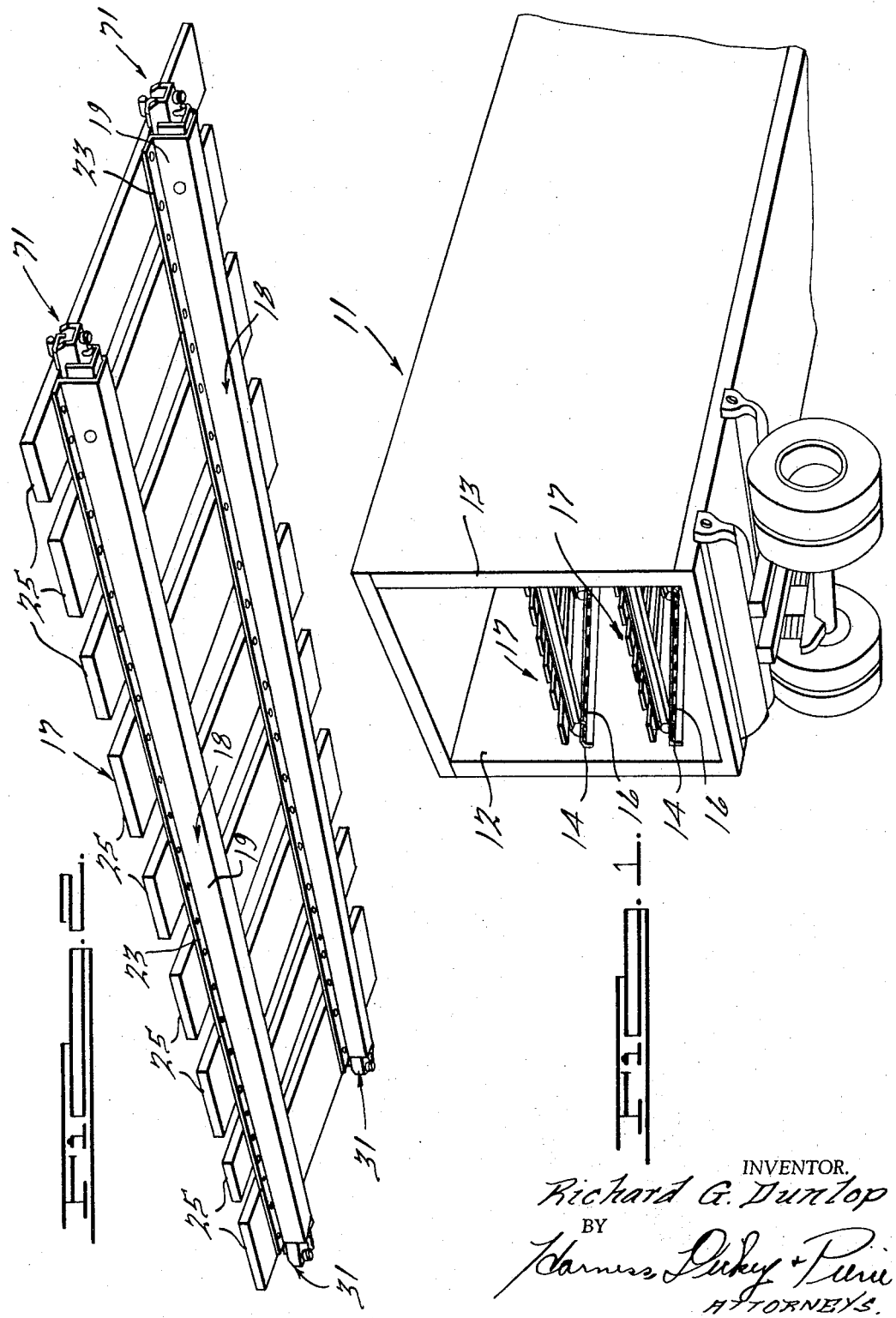
INVENTOR.
Richard G. Dunlop
BY
Harness, Dickey & Pierce
ATTORNEYS.

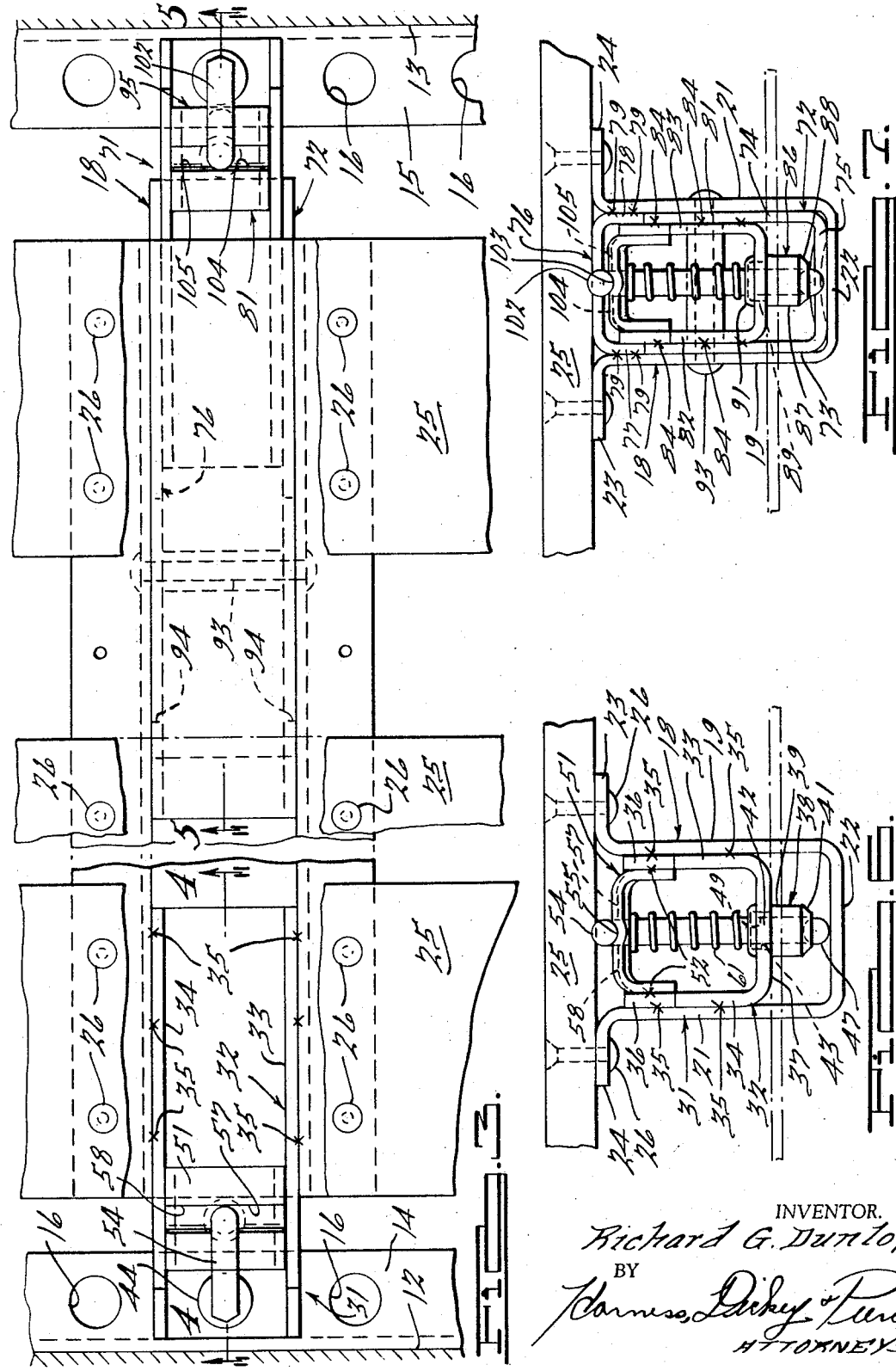

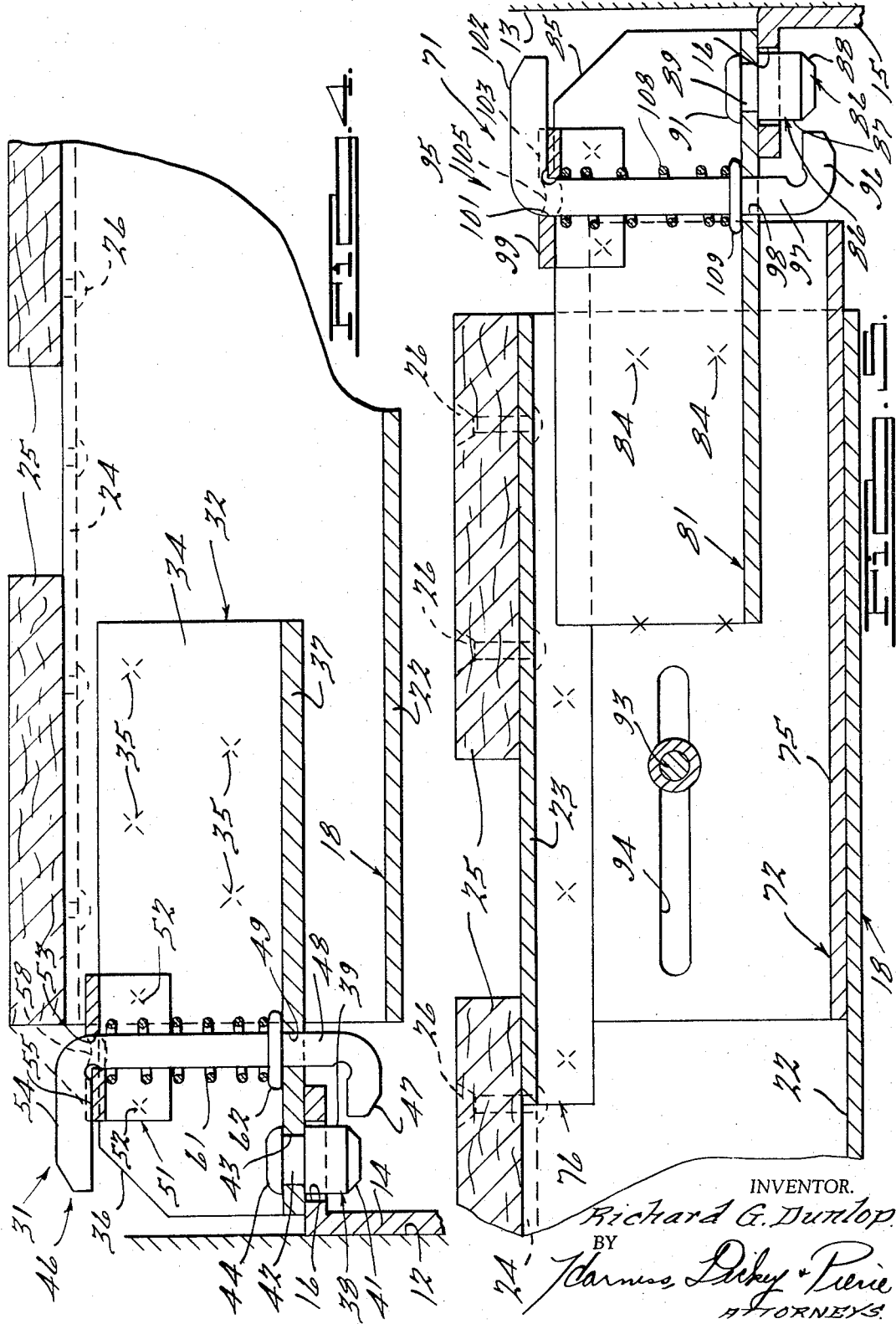

United States Patent Office 3,367,287
Patented Feb. 6, 1968

3,367,287
FREIGHT HANDLING APPARATUS
Richard G. Dunlop, Livonia, Mich., assignor to Evans
Products Company, a corporation of Delaware
Filed Sept. 7, 1965, Ser. No. 485,359
7 Claims. (Cl. 105—371)

ABSTRACT OF THE DISCLOSURE

This application discloses a truck decking member that is supported upon spaced belt rails affixed to opposite side walls of the truck. The decking member is a unitary assembly made up of spaced cross members carrying end fittings at each end and effecting a detachable connection to the respective belt rail. Supporting members extend perpendicularly to the cross members and are rigidly affixed to the cross members.

---

This invention relates to a freight handling apparatus, and more particularly to a decking member for supporting or transporting articles that cannot be stacked upon each other.

In transporting or handling articles that cannot be stacked upon each other, it is common practice to employ some form of decking device to provide vertically spaced shelves so that the full height of the transporting or storing area can be utilized. When transporting goods in such a manner through the use of trucks, railway cars, or the like, it has been common practice to provide cross members that are affixed to longitudinally spaced apertures formed by belt rails that are affixed to the sides of the vehicle. Support members are positioned across the cross members to support the articles being transported. This type of transporting method is not completely satisfactory since a plurality of different types of components are required to form the decking device. Since the components are all separate, it is quite likely that individual portions may be lost with the possibility of rendering the remaining components useless.

It is, therefore, a principal object of this invention to provide a unitary decking member for supporting articles that cannot be stacked upon each other.

Although a unitary decking member embodying this invention could be supported directly upon the belt rails or other attachment means of the transporting vehicle, there is the possibility of accidental shifting of the decking member or disengagement from the belt rails. It is, therefore, a further object of this invention to provide a decking member embodying an improved means for attaching the decking member to belt rails or other attachment means of a transporting vehicle.

It is a still further object of the invention to provide an improved latch for locking a decking member or other similar freight handling apparatus to the attachment means for a vehicle.

A freight decking member embodying this invention comprises a pair of cross members having end fittings that are adapted to effect a detachable connection to attachment means formed on vertically extending spaced walls of a transporting or storage device. A plurality of transversely extending support members are rigidly affixed to the cross members to complete the assembly.

As a further feature of the invention, a latch mechanism may be provided at at least one end of each of the cross members. The latch mechanism consists of a support member and a latch member supported by the support member for pivotal movement from an engaged to a disengaged position. An operating handle for pivoting the latch member is also supported by the support member. Detent means are formed upon the support member for retaining the operating handle and latch member in its engaged and disengaged position. Biasing means yieldably urge the operating handle into engagement with the detented means to insure against accidental release.

Other objects and advantages of this invention will become more apparent as this description proceeds, particularly when considered in conjunction with the accompanying drawings, wherein:

FIGURE 1 is a partial perspective view of a freight transporting vehicle embodying this invention;

FIGURE 2 is a perspective view taken from below of a freight decking member embodying this invention;

FIGURE 3 is a top plan view, with portions broken away, of a portion of the decking member shown in FIGURE 1 in the area of one of its cross members;

FIGURE 4 is an enlarged cross sectional view taken along the line 4—4 of FIGURE 3;

FIGURE 5 is an enlarged cross sectional view taken along the line 5—5 of FIGURE 3;

FIGURE 6 is an end view of the portion of the cross bar shown in FIGURE 4; and

FIGURE 7 is an end view of the portion of the cross bar shown in FIGURE 5.

Referring now in detail to the drawings and in particular to FIGURE 1, a portion of a cargo transporting truck is indicated generally by the reference numeral 11. It is to be understood that, although this invention is described in conjunction with a truck because it has particular application with trucks, the invention is susceptible of use in any other type of cargo transporting vehicle, such as a railway car or boat or may be utilized in stationary freight storage areas. The truck 11 has a cargo carrying area defined in part by a pair of spaced vertically extending walls 12 and 13. A plurality of longitudinally extending, vertically spaced belt rails 14 are affixed to the wall 12 within the freight storage area and similar belt rails 15 (FIGURES 3 and 5) are affixed to the wall 13.

Circular apertures 16 are formed at equal longitudinal distances along the outstanding leg of the belt rails 14 and 15 for a purpose which will become more apparent as this description proceeds.

In many instances, articles are carried by the truck 11 that cannot be stacked directly upon each other. To utilize the total height of the truck storage area, a plurality of freight decking members, indicated generally by the reference numeral 17, are supported upon the belt rails 14 and 15 across the width of the storage area. The decking members 17 permit a single layer of articles to be stacked or a number of articles to be stacked on each decking member 17 that will not be injurious to the bottommost article. The decking members 17 are constructed so that they form a unitary assembly that may be carried in the truck 11 when not in use or may be stored at any convenient location.

Each decking member 17 includes a pair of identical longitudinally spaced, open ended, channel shaped cross members, indicated generally by the reference numeral 18. The cross members 18 may be formed from aluminum or some other light-weight metal and have upstanding legs 19 and 21 that are integrally connected at their lower ends by a web 22. The uppermost extremity of the legs 19 and 21 are formed with an integral outstanding flange 23 and 24, respectively, that extend in a generally longitudinal direction. A plurality of laterally spaced support members 25 extend transversely between the cross members 18 and overlap the flanges 23 and 24. Preferably, the support members 25 are formed from lumber and comprise identically shaped and sized pieces. A plurality of bolts or other type of threaded fasteners 26 pass through apertures in the flanges 23 and 24 to affix the support members 25 to each cross member 18. The freight may thus be supported upon the support members 25.

A fixed end fitting, indicated generally by the reference numeral 31 and shown in more detail in FIGURES 3, 4 and 6, is supported within one open end of the cross members 18 at one side of the decking member 17. The fixed end fitting 31 is comprised of a channel shaped member 32, having upstanding legs 33 and 34 that are parallel to and abut the legs 19 and 21 of the cross member 18. The legs 33 and 34 are affixed, as by the welds 35, to the legs 19 and 21 with the channel 32 protruding slightly from beyond the end of the cross member 18. The upper end of the legs 33 and 34 are chamfered or cut off, as at 36.

At the outer end of an integral web 37 that connects the legs 33 and 34, a locking pin 38 having a cylindrical locking portion 39 which terminates at its lower end in a beveled end 41 to facilitate insertion of the locking portion 39 within the apertures 16 of the belt rails 14 and 15. A smaller diameter shank portion 42 of the locking pin 38 extends through an aperture 43 formed in the web 37. An upset portion 44 of the locking pin 38 formed above the web 37, fixes the locking pin 38 with respect to the channel 32.

In addition to the locking pin 38, a latch mechanism, indicated generally by the reference numeral 46, is provided for each of the fixed end fittings 31 to insure that the decking member 17 will not become accidentally disengaged from the belt rails 14. The latch mechanism 46 includes an offset locking hook 47 that is integrally connected to a shank portion 48 that extends through and is pivotally supported within a cylindrical bore 49 formed in the web 37 of the channel member 32. An inverted channel shaped bridging member 51 is welded across the open end of the legs 33 and 34, as by the welds 52. The bridging member 51 is formed with an aperture 53 that journals the upper end of the shank portion 48 of the latch 46. An integral, offset operating handle 54 extends from the upper end of the shank portion 48 across the web of the bridging member 51.

The bridging member 51 is formed with a first detent recess 55 that is adapted to receive the operating handle portion 54 when the latch 46 is in its engaged position. A pair of detent recesses 57 and 58 are also formed in the web of the bridging member 51 at a position displaced 90° from the detent recess 55. The detent recesses 57 and 58 serve to lock the latch mechanism 46 in its disengaged position. A coil spring 61 engages the lower surface of the bridging member 51 and an upset portion 62 of the shank portion 48 of the latch mechanism 46. The spring 61 normally engages a latch mechanism 46 downwardly until the upset portion 62 engages the web 37 and the operating handle portion 54 is in registry with one of the detent recesses 55, 57 or 58.

An adjustable or sliding end fitting, indicated generally by the reference numeral 71 and shown in more detail in FIGURES 3, 5 and 7, is supported in the open end of each cross member 18 opposite to the fixed end fitting assemblies 31. The sliding end fitting assemblies 71 comprise a first channel shaped member 72 having upstanding legs 73 and 74 that are parallel to and slidably engage the legs 19 and 21 of the cross member 18. An integral web 75 connects the legs 73 and 74 and engages the web 22 of the cross member 18. An inverted channel 76 is received in the channel shaped cross member 18 above the channel 72 and has a pair of depending legs 77 and 78 that are spot welded as at 79 to the legs 19 and 21, respectively, of the cross member 18. The lower ends of the legs 75 and 78 contact the upper ends of the legs 73 and 74 of the channel shaped member 72 so that it cannot move vertically with respect to the cross member 18.

A smaller channel shaped member 81 is contained within the channel shaped member 72 and has upstanding legs 82 and 83 that are spot welded, as at 84 to the legs 73 and 74. The outer ends of the legs 82 and 83 are cut off, as at 85.

A locking pin, indicated generally by the reference numeral 86, is supported at the outer end of the web of the channel shaped member 81 to engage the apertures 16 of the belt rail 15 to form a detachable connection between the decking member 17 and the belt rail 15. The locking pin 86 has a cylindrical portion 87 that is complementary in shape to the aperture 16 and terminates at its lower end in a beveled portion 88 which facilitates insertion. A smaller diameter cylindrical portion 89 of the locking pin 86 extends through a correspondingly shaped aperture in the web of the channel shaped member 81 and an upset portion 91 formed above the web affixes the locking pin 86 to it.

The channel shaped members 81 and 72 are free to slide longitudinally within the cross member 18. A pin 93 extends through apertures formed in the upstanding legs 19 and 21 of the cross member 18 and through elongated slots 94 formed in the legs 73 and 74 of the channel shaped member 72. The coaction of the pin 93 with the slots 94 limits the degree of axial movement of the sliding or adjustable end fitting 71 with respect to the decking member and insures that these parts will not become disassociated.

A latch mechanism, indicated generally by the reference numeral 95 and substantially similar to the latch mechanism 46 of the fixed end fitting 31 is provided for each of the sliding end fittings 71. The latch mechanism 95 includes an offset hook shaped locking end 96 that is integrally connected to a shank portion 97 that is journaled for pivotal movement within a circular aperture 98 in the web of the channel shaped member 81. An inverted channel shaped bridging member 99 is affixed, as by welding to the upper ends of the legs 82 and 83. The bridging member has an aperture 101 that journals the upper end of the cylindrical portion 97. An offset operating handle 102 is integrally connected to a shank portion 97 above the upper surface of the bridging member 99. The bridging member 99 also has a locking detent recess 103 that retains the operating handle 102 and latch assembly 95 in its engaged position and locking detent recesses 104 and 105 that are adapted to retain the latch mechanism 95 in its disengaged position. A coil spring 108 engages the underside of the bridging member 99 and an upset portion 109 of the cylindrical part 97 to urge the operating handle 102 into the respective detent 103, 104 or 105.

The drawings illustrate the decking member 17 in an assembled position upon the belt rails 14 and 15. It will be noted that the locking pins 38 and 86 extend through the aperture 16 to form a detachable connection between the decking member 17 and the side walls 13 and 14 of the truck 11. The longitudinal position of the decking member 17 with respect to the belt rails 14 and 15 may be adjusted by appropriately selecting which of the apertures 16 receive the locking pins 38 and 86. The latching mechanisms 46 and 95 are rotated so that the locking hook portions 47 and 96 face the locking pins 38 and 86. In this position they extend beneath the outwardly extending portion of the belt rails 14 and 15 and thus the decking member 17 cannot be removed from the belt rails 14 and 15.

To remove the decking member, the operating handle portion 54 or 102 of the respective latch mechanism is rotated free of the locking detent 55 or 103 by compressing the springs 61 or 108. The latch mechanism is swung to the disengaged position as indicated by either detent 57 or 58 or detent 104 or 105. In this position the coil spring 61 or 108 will again urge the latching member downwardly into engagement with the respective detent. When released, the locking hook portion 47 or 96 are free to the lower surface of the belt rails and the respective end of the decking member 17 may be removed from the respective belt rail.

It should be apparent that the use of the adjustable or sliding end fitting 71 permits the decking member 17 to be used in vehicles having different spacing between their side walls. The end fitting 71 may also slide with respect to the cross member 18 during flexure of the walls 12 and 13, which is a common occurrence. Thus, it will automatically compensate for this flexure without damage to the decking member.

It is to be understood that various changes and modifications may be made without departing from the spirit and scope of this invention, as defined by the appended claims.

What is claimed is:

1. A freight decking member adapted to span a pair of spaced members having attachment means comprising a pair of longitudinally spaced open ended channel shaped cross members, a plurality of laterally spaced support members extending transversely between said cross members, means affixing said support members to said cross members to provide a unitary decking assembly, a first end fitting received in one open end of each of said cross members and rigidly affixed thereto for effecting a detachable connection to the attachment means at the respective side of said decking member, an adjustable end fitting slidably supported for telescopic movement in the other open end of each of said cross members for effecting a detachable connection to the attachment means at the respective side of said decking member and for compensating in variation spacing between the vertically extending members, a locking pin affixed to each of said end fittings and adapted to cooperate with an aperture in the attachment means for effecting a detachable connection to the attachment means, and a latch mechanism for at least one end fitting of said cross members, said latch mechanism comprising a latch member supported for pivotal movement from an engaged position facing the respective locking pin to a disengaged position, an operating handle for pivoting said latch member, detent means for retaining said operating handle and said latch member in its engaged and disengaged positions and biasing means for yieldably urging said operating handle into engagement with said detent means.

2. A latch mechanism for attaching the end fitting of a freight decking member to an attachment means having a plurality of spaced apertures comprising a channel shaped support member, a locking pin positioned at one end of the web of said support member and adapted to engage an aperture in the attachment means, a latch member supported by said web inwardly of said locking pin for pivotal movement from an engaged position facing said locking pin to a disengaged position, a bridging member spanning the upper ends of the legs of said channel shaped support member, an operating handle supported by said bridging member for pivoting said latch member, detent means upon said bridging member for retaining said operating handle and said latch member in its engaged and disengaged positions, and biasing means for yieldably urging said operating handle into engagement with said detent means.

3. A freight decking member adapted to span a pair of spaced members having attaching means with apertures formed therein comprising a pair of longitudinally spaced channel shaped cross members, a plurality of laterally spaced support members extending transversely between said cross members, means affixing said support members to said cross members to provide a unitary decking assembly, an end fitting supported in each open end of each of said channel shaped cross members, each end fitting comprising a pair of upstanding legs extending parallelly to the legs of said cross members and a transversely extending web, a locking pin affixed to the outer end of each web for cooperation with the apertures in the attachment means for effecting a detachable connection between said decking member and the attachment means, and a latch mechanism for at least one end fitting of each of said cross members, each latch mechanism comprising a latch member supported by the respective web inwardly of the respective locking pin for pivotal movement from an engaged position facing said respective locking pin to a disengaged position, a bridging member extending between the legs of the end fitting, an operating handle supported by said bridging member for pivoting said latch member between its engaged and disengaged positions, detent means formed upon said bridging member for retaining said operating handle and said locking member in its engaged and disengaged position and biasing means for yieldably urging said locking handle into engagement with said detent means.

4. A freight decking member as set forth in claim 3 wherein one end fitting of each of the cross members is affixed to the respective end of the cross member and the other end fitting of the respective cross member is slidably supported by the cross member for compensating for variations in the spacing between the pair of spaced members.

5. A freight decking member adapted to span a pair of spaced walls having belt rails formed with longitudinally spaced apertures affixed thereto comprising a pair of longitudinally spaced channel shaped open ended cross members, a longitudinally extending flange formed at the upstanding end of each leg of each of said cross members, a plurality of laterally spaced support members extending transversely between said cross members, means affixing said support members to said flanges to provide a unitary decking assembly, an end fitting supported within each open end of each of said cross members, each of said end fittings comprising a channel shaped member having its legs extending substantially parallel to the legs of said cross members, a locking pin affixed at the outer end of the web of said cross member for cooperation with the apertures in the belt rails to effect a detachable connection between the said decking member and the belt rails, a bridging member spanning the open ends of the legs of said end fitting, a latching member supported for pivotal movement by the web of said end fittings inwardly of said locking pin for pivotal movement from an engaged position facing the locking pin and adapted to engage the underside of the belt rail to a disengaged position, an operating handle supported by said bridging member for pivoting said latch member between its engaged and disengaged positions, detent means upon said supporting member for retaining said operating handle and said locking member in its engaged and disengaged positions, biasing means for yieldably urging said operating handle into engagement with said detent means, means for affixing one of said end fittings into the respective end of each of said cross members, and means for slidably supporting the other of said end fittings within the respective open end of each of said cross members.

6. A freight decking member adapted to span a pair of spaced members having attaching means with apertures formed therein comprising a pair of longitudinally spaced channel shaped cross members, at least one support member extending between said cross members and affixed thereto to provide a unitary decking assembly, an end fitting supported in each open end of each of said channel shaped cross members, each end fitting comprising a pair of upstanding legs extending parallelly to the legs of said cross members and a transversely extending web, a locking pin affixed to the outer end of each web for cooperation with the apertures in the attachment means for effecting a detachable connection between said decking member and the attachment means, and a latch mechanism for at least one end fitting of each of said cross members, each latch mechanism comprising a latch member supported by the respective web inwardly of the respective locking pin for pivotal movement from an engaged position facing said respective locking pin to a disengaged position, a bridging member extending between the legs of the end fitting, an operating handle supported by said bridging member for pivoting said latch member between its engaged and disengaged positions, detent means formed upon said bridging member for retaining said operating handle and said locking member in its engaged and disengaged position and biasing means for yieldably urging said locking handle into engagement with said detent means.

7. A freight decking member adapted to span a pair of spaced walls having belt rails formed with longitudinally spaced apertures affixed thereto comprising a pair of longitudinally spaced channel shaped open ended cross members, a longitudinally extending flange formed at the upstanding end of each leg of each of said cross members, at least one support member extending between said cross members and affixed thereto to provide a unitary decking assembly, an end fitting supported within each open end of each of said cross members, each of said end fittings comprising a channel shaped member having its legs extending substantially parallel to the legs of said cross members, a locking pin affixed at the outer end of the web of said cross member for cooperation with the apertures in the belt rails to effect a detachable connection between the said decking member and the belt rails, a bridging member spanning the open ends of the legs of said end fitting, a latching member supported for pivotal movement by the web of said end fittings inwardly of said locking pin for pivotal movement from an engaged position facing the locking pin and adapted to engage the underside of the belt rail to a disengaged position, an operating handle supported by said bridging member for pivoting said latch member between its engaged and disengaged positions, detent means upon said supporting member for retaining said operating handle and said locking member in its engaged and disengaged positions, biasing means for yieldably urging said operating handle into engagement with said detent means, means for affixing one of said end fittings into the respective end of each of said cross members, and means for slidably supporting the other of said end fittings within the respective open end of each of said cross members.

References Cited

UNITED STATES PATENTS

| | | | |
|---|---|---|---|
| 1,205,674 | 11/1916 | Shelton | 105—370 |
| 2,603,168 | 7/1952 | Edwards | 105—370 |
| 2,841,437 | 7/1958 | Turpin | 296—10 |
| 3,101,969 | 8/1963 | Fleming | 296—24 |
| 2,467,687 | 4/1949 | McKinney | 105—369 |
| 2,540,207 | 2/1951 | Mangels | 105—369 |
| 2,576,425 | 11/1951 | Thearle | 105—369 |
| 2,586,857 | 2/1952 | Page | 105—371 |
| 2,982,230 | 5/1961 | Chapman | 105—369 |
| 3,066,620 | 12/1962 | Schroeder | 105—369 |
| 3,095,830 | 7/1963 | Runken | 105—369 |
| 2,336,440 | 12/1943 | Kass | 105—369 |

ARTHUR L. LA POINT, *Primary Examiner.*

DRAYTON E. HOFFMAN, *Examiner.*